Dec. 31, 1929.　　　A. H. NEULAND　　　1,741,428

POWER CONTROL SYSTEM

Original Filed June 15, 1923　　2 Sheets-Sheet 1

INVENTOR
ALFONS H. NEULAND
BY
ATTORNEYS

Dec. 31, 1929.   A. H. NEULAND   1,741,428
POWER CONTROL SYSTEM
Original Filed June 15, 1923   2 Sheets-Sheet 2
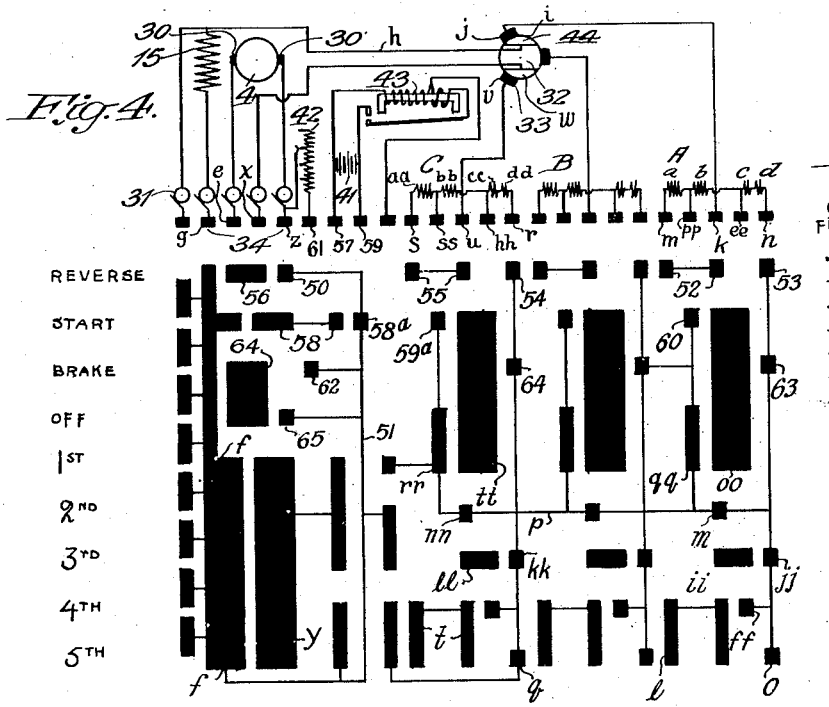
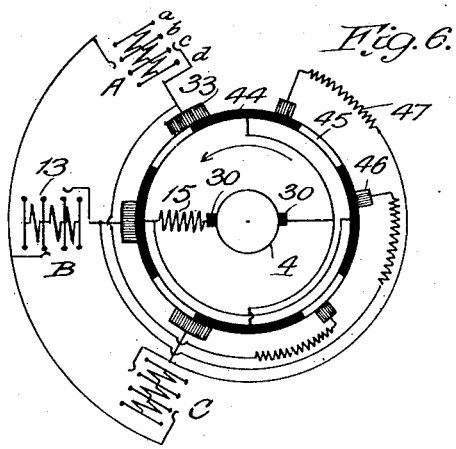
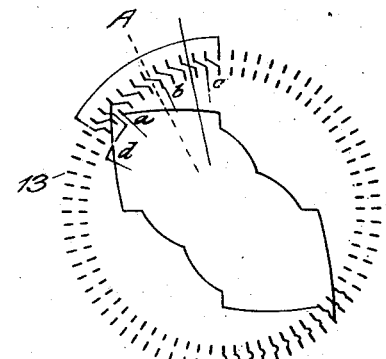
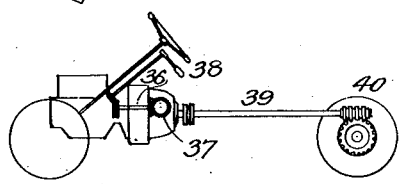
INVENTOR
ALFONS H. NEULAND
BY
ATTORNEYS Patented Dec. 31, 1929

1,741,428

UNITED STATES PATENT OFFICE

ALFONS H. NEULAND, OF IRVINGTON, NEW JERSEY

POWER-CONTROL SYSTEM

Application filed June 15, 1923, Serial No. 645,519. Renewed October 23, 1929.

My invention relates to electromagnetic systems and is particularly intended to change the speed and torque ratios between a prime mover or an element rotating at a given speed and an element or shaft the speed and torque of which is to be changed and controlled with relation of the prime mover or driving element.

One object of my invention is to provide for an apparatus of light weight and high power, particularly when applied to motor vehicles in connection with combustion engines. Another object is to obtain a double speed range of the driven element, one below the driver speed with correspondingly increased torque and the other range above the driver speed. Another object is to obtain a sufficiently powerful reverse torque without resorting to mechanical gearing. Another object is to have the apparatus perform a number of auxiliary functions desirable in the operation of a motor vehicle such as charging the battery, starting the engine, electric braking, etc. Another object of my invention is to provide a system capable of developing a very powerful intermittent torque at one operating speed and at another speed to absorb or carry the entire engine torque for prolonged periods easily and without overheating. Still other objects and advantages of my invention will appear from the following specification in which I have described my control system as adapted to a motor vehicle although it is to be understood that this system may be employed for various other purposes such as hoists, elevators, railway cars and the like.

Application of electrical transmission and control systems to automobiles has heretofore been difficult due to the considerable additional weight of the devices resulting partly from the control methods employed such as weakening the field strength or shifting the brushes, in either of which cases the torque or torque reaction is lessened.

My invention overcomes these difficulties in that I maintain a strong magnetic field and a quadrature relation between the currents in the dynamo windings and the field. In addition I transfer only a portion of the engine torque directly to the driven element while another portion of the engine torque is transformed into electrical energy and made to increase the speed of the driven element beyond that of the engine, the higher speed of the driven element is then reduced by gearing or preferably taken care of by a greater reduction ratio in the rear axle of the automobile. By this latter means a substantial saving in the weight is effected.

My system comprises three major parts, the field or driving element secured to the engine shaft, an armature or driven element facing the field poles on one side and a stator or dynamo element facing the field poles on the other side, so that a common magnetic flux traverses the elements. The three windings on these elements are connected in series to form the main circuit and the principal functions of the system are effected; I, by varying the number of stator turns in the circuit, the stator potential adding to the armature potential and causing the armature to rotate faster than the field; II, by reversing a portion of the stator winding with respect to the armature, in which instance the armature potential overcomes the stator potential, reverses the stator current, causes the armature to rotate slower than the field and to produce a torque exceeding the applied torque; III, by reversing the armature winding, causing the stator potential to overpower the armature potential thereby reversing the current in the armature and causing it to rotate in a reverse direction to the engine; IV, by reversing the armature and stator windings with respect to the field when starting the engine. In short, broadly speaking, the system comprises the rotation of a primary or driving field element with a common magnetic flux emanating therefrom and producing two independent voltages in two induced windings forming an electric circuit in which the field winding is included, and means for changing the magnitude or direction or both of one voltage with respect to the other and to the field, while maintaining electrical quadrature between field and induced windings, the two induced windings being arranged in the magnetic circuit so that the current in one induced winding can affect the field element independently of the current in the other induced winding.

Also in accordance with my invention the wiring connections between the elements are simplified and to this end my invention comprehends the arrangement of the controller within the stationary casing and in close proximity to the stator winding and the brush leads.

My invention also comprehends various features of electrical arrangement and mechanical construction, details and arrangement of parts, as will hereinafter more fully appear. I shall now describe the illustrated embodiment of my invention and shall thereafter point out my invention in claims.

Fig. 4 is a diagram of the electric circuits including the controller contacts by means of which connections are made corresponding to the various functions;

Fig. 5 is a representation of the relative strength, position and direction of the currents in the three elements corresponding with the various controller positions in Figure 4;

Fig. 6 is a diagrammatic representation of the field commutator with its main and auxiliary brushes and a simplified representation of the electric circuits connected thereto;

Fig. 7 shows how the ends of the stator coils are connected to form groups and their leads for one phase;

Fig. 8 is a partial outline of a motor vehicle showing particularly the high worm gear reduction at the rear axle.

Figure 1:
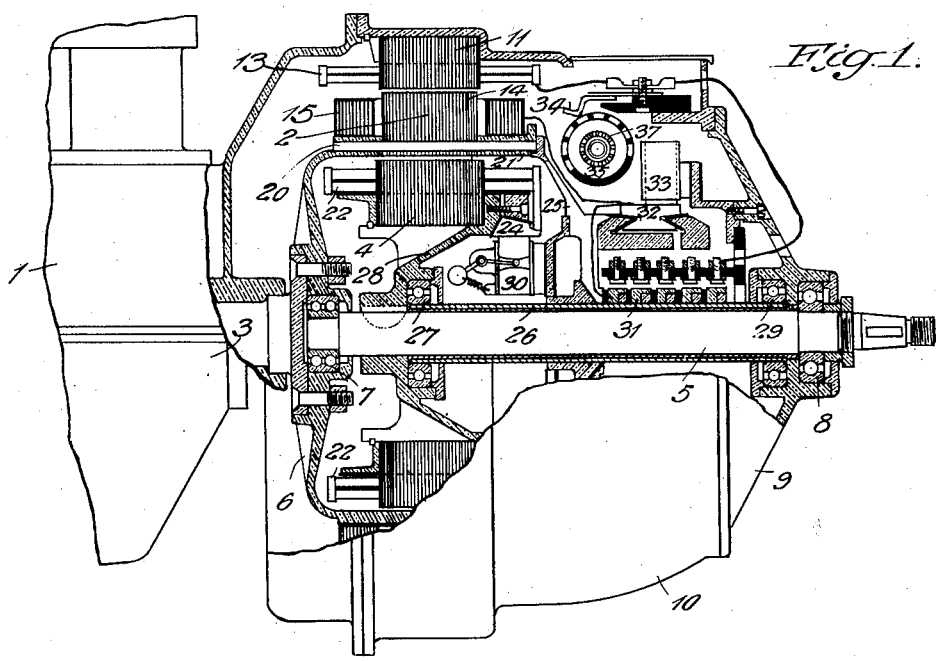
Fig. 1 is a partial longitudinal section and a partial side elevation of a control system embodying my invention.
Figures 2, 3:
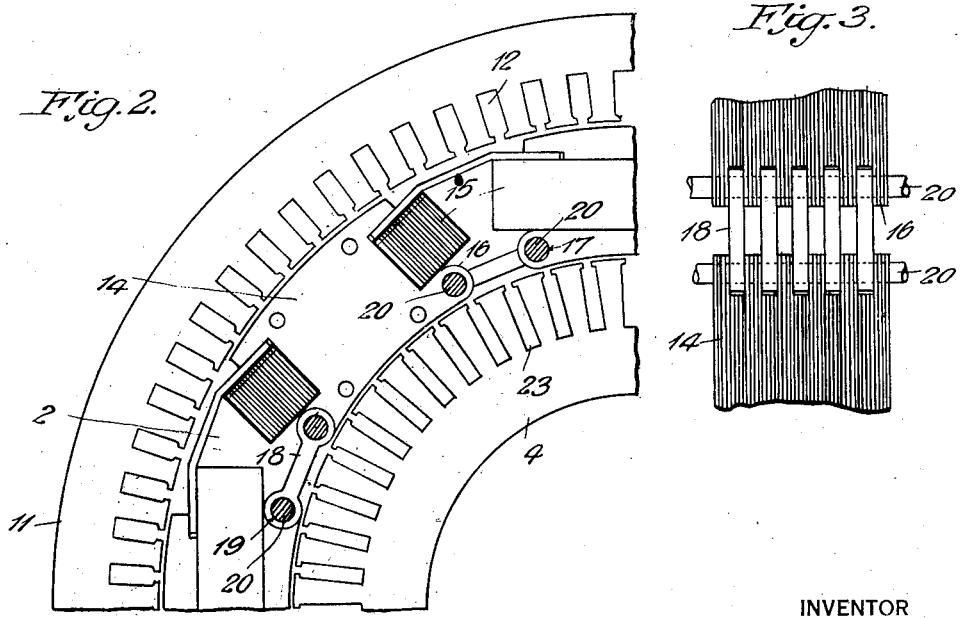
Fig. 2 is a segment of a transverse section, showing the magnetic structure and particularly the construction of the field poles and links tying them to one another.
Fig. 3 is a fragment of the field poles illustrating the manner in which the supporting rods tie the links with the pole pieces.

The control system which I have selected for illustration in the drawings is adapted to automobiles propelled by an internal combustion engine 1, in that the driving or field element 2 serves as the fly wheel, and is rigidly secured to the crank shaft 3. The driven element or armature 4 is connected to the propeller shaft 5 which is carried at one end by the field spider 6 through the ball bearing 7. The propeller or drive shaft is supported near its other end by the bearing 8, which in turn, is mounted in a bearing seat of the stationary bracket 9; the bracket being secured to the housing 10, which carries the stator or dynamo element 11 built up of laminations having slots 12 on their inner circumference in which the distributing winding 13, is embedded. The field element 2, is provided with eight pole pieces 14, each of which carries a field coil 15. The centrifugal forces acting on the field poles is very great when the field element rotates rapidly; and in order to withstand these forces and in order to insure rigidity while the field member acts as a fly wheel for the engine, I build up the field member of independent sections, each section constituting a fixed pole and sections having extensions 16 at their inner face which are provided with holes 17. Links 18 made up from non-magnetic material and provided with holes 19 at their ends fill the spaces between the pole piece extensions. The bolts 20, tie the links with the pole pieces. This virtually forms a chain which is well adapted to withstand the centrifugal stresses. The bolts 20 extend through the pole pieces at both ends, being pressed into the non-magnetic spider 6 on one side and into a non-magnetic tie ring 21 on the other side. This insures a proper radial alignment of the field poles.

The armature 4 includes a winding 22 embedded in the slots 23 and connected to the commutator 24 which is provided with an internal face.

Secured to the field element is the spider 25 which is carried by the sleeve or tubing 26. This tubing in turn is rotatively supported by the bearing 27 in the armature spider 28 at one end and at the other end by the bearing 29. This construction makes for great rigidity and prevents distortion of the air gaps under severe operating conditions.

This spider 25 carries the armature brushes 30, the five slip rings 31 and the field commutator 32. All these rotate with the field and together with the stationary polyphase field brushes 33, wiping the commutator 32 permit the windings of the three elements to be conductively connected in series relation with each other.

The connections between the windings are made by means of the contact fingers 34 pressing upon the controller drum 35 which latter is rotatively moved to the various operating positions shown in Figure 4 by means of the connecting rod 36, Figure 8, engaging the drum gear 37 and conveniently arranged to be actuated by the controlling lever 38 near the steering wheel.

In Figure 4 I have shown the contacts on the controller drum surface and on the left side indicated the functions which will be obtained from the controller in the various positions. Figure 5 at the right represents the relative strength, position and direction of the currents in the stator, field and armature elements for each of the positions on the controller.

Referring to Figures 4, 6 and 7 it is seen that the stator is provided with a polyphase winding and preferably comprises three phases, A, B, C. The number and spacing of the stationary brushes wiping the field commutator must correspond to the number of phases comprising the stator winding and have the same spacing or its equivalent. Each phase is furthermore divided into a number of groups, in the present instance three groups being used provided with the leads *a*, *b*, *c*, *d*. These groups are so arranged with respect to each other and with respect to the field brushes to which they are connected by the leads *a*, *b*, *c*, *d*, that when the potential in a given group or phase has decreased to zero the particular brush 33 to which such phase or group is connected, will at that moment leave the wide effective segment on the field commutator.

Referring to Figure 4, the fifth step, in which the entire stator winding is included and the connections are such that the currents in both the stator and armature are in a forward direction, as appears from Figure 5. Current from the armature 4 flows to the finger *e*, the control contact *f*, finger *g*, field coil 15, segment *i* of commutator 44, brush *j*, finger *k* to contact *l*, finger *m*, coils *a*, *b*, *c*, *d*, finger *n*, contact *o*, wire *p*, contact *q*, finger *r*, coils *dd*, *cc*, *bb*, *aa*, finger *s*, contact *t*, finger *u*, brush *v*, segment *w* of commutator 44, then to finger *x*, contact *y*, finger *z*, and through armature 4 to complete the circuit.

In this stage, the prime mover transfers part of its energy or torque directly to the load or propeller shaft. The balance of the prime mover energy is converted into electrical energy in the dynamo element or stator and fed into the armature, to increase its speed. This stage will drive the armature at the highest speed, and assuming roughly that there are twice as many turns in series in the stator winding as there are in the armature, the speed of the armature will exceed that of the field element three times because with the armature at rest the rotation of the field against it will induce a certain potential therein and the rotation of the field element with relation to the stator winding will generate therein a potential twice that in the armature making the total potential in the circuit three times that in the armature or 300%. Inasmuch as a 100% potential in the circuit will make the armature rotate at nearly the speed of the engine or practically 100% it follows that the armature will turn three times faster with a potential three times higher.

The high speed of the driven armature and the propeller shaft 39 connected thereto is reduced at the rear axle by means of the worm gearing 40. It is to be noted that while I prefer to use a higher reduction ratio in the rear axle than found in present standard automobiles, I am able, on account of the double speed range of the machine to select a reduction ratio that will produce a greater car speed with a given engine speed; for instance: One standard make of automobile will travel 20 miles per hour with the engine turning 900 R. P. M. and rear axle having a reduction 4½ : 1. With my system on the fifth step with the engine turning at 900 R. P. M. and the reduction ratio of 9 :1, the car speed would be 30 miles per hour, thus effecting a saving in fuel and oil. In this connection it should also be noted that the engine torque is absorbed partly by the armature due to the direct transfer of the torque and partly by the stator winding. It is the last named torque component that is converted into electrical energy and transferred to the armature in the form of increased speed.

In the fourth step the armature and field connections remain the same as in the fifth step except that one group in each phase of the stator winding is left out of circuit, this being the group *c d*, and it will be seen that the magneto motive forces in the remaining groups *a*, *b*, *c*, have not changed their center with respect to the field brushes. In this step the speed of the armature is reduced with respect to that of the field. In this controller position, current from the armature 4 flows to the finger *e*, controller contact *f*, finger *g*, field coil 15, segment *i*, of commutator 44, brush *j*, finger *k*, contact *l*, finger *m*, through coils *a*, *b*, finger *ee*, contact *ff*, wire *p*, contact *gg*, finger *hh*, coils *bb*, *aa*, finger *s*, contact *t*, finger *u*, brush *v*, segment *w*, finger *x*, contact *y*, finger *z*, and back to the armature 4 to complete the circuit.

In this stage, a larger portion of energy and torque is directly transferred to the armature or load, the balance being transformed into electrical energy in the dynamo element and fed into the armature to supply the differential speed.

In the third step the number of stator turns in series is still further reduced, the group *c d* alone being used in each phase. This further reduces the armature speed with respect to the driver and again it should be noted that the force center has not changed. In this step the bulk of the engine energy is directly transferred to the load, and only a minor portion is converted into electrical energy and fed to the armature to amplify its speed. In this step, controller position 3, current from the armature 4 flows to finger *e*, controller contact *f*, finger *g*, field coil 15, segment *i* of commutator 44, brush *j*, finger *k*, contact *ii*, finger *ee*, coils *cd*, finger *n*, contact *jj*, wire *p*, contact *kk*, finger *r*, coils *dd*, *cc*, finger *hh*, contact *ll*, finger *u*, brush *v*, segment *w*, finger *x*, contact *y*, finger *z*, and back to armature 4 to complete the circuit.

The second step comprises straight drive, the stator winding being entirely left out of circuit and the field brushes being closed upon themselves so that the armature and field operate as a clutch the speed of the one being nearly that of the other. In this step, current flows from the armature 4 to finger e, controller contact f, finger g, field coil 15, segment i of commutator 44, brush j, finger k, contact mm, wire p, contact nn, finger u, brush v, segment w, finger x, contact y, finger z, and back to the armature 4 to complete the circuit. In this stage all of the engine energy is directly transferred to the load. In this connection it is important to note the effect of the comparatively large rear axle reduction ratio upon the saving in the weight and size of the apparatus for the reason that with a 9:1 rear axle ratio assumed above a given engine torque will develop twice the torque at the rear wheels compared with present practice using a 4½:1 ratio, or inversely for a given torque required at the rear wheels the drive shaft or driven element will only have to supply one half the torque otherwise needed; consequently the transmission device can be of smaller proportions and lighter weight.

In the first forward step the armature and field connections are the same as above and one group per phase of the stator windings is included in the circuit but in a reverse relation to the armature, as shown in Figure 5, the armature potential predominating and causing currents in the stator winding to flow in the reverse direction. In this step, current from the armature 4 flows to the finger e, controller contact f, finger g, field coil 15, segment i of commutator 44, brush j, finger k, contact oo, finger ee, stator coil b in reverse direction, finger pp, contact qq, wire p, contact rr, finger ss, coil bb, finger hh, contact tt, finger u, brush v, segment w, finger x, contact y, finger z, back to armature 4 to complete the circuit.

In this stage, the torque supplied to the load or propeller shaft is amplified or boosted. The prime mover transfers its full torque to the load at a reduced speed or speed difference. Due to this speed difference, the differential electrical energy thereby produced is converted into mechanical energy by means of a dynamo element 13 and return to the prime mover. The armature speed is thereby considerably reduced, and the energy represented by the slip is consumed in the stator and made to produce a torque on the field element so that the field element while exerting a powerful torque on the armature receives only a part of that torque from the prime mover and another part from the stator element and as a result the torque developed by the driven element exceeds that of the prime mover. It should be noted that the flow of energy due to the speed difference, between the prime mover and the load, that is, the flow of differential energy between the dynamo windings 13 and 22 reverses. In the first step or stage, the differential energy flows from the winding 22 of the load armature 4 to the stator or dynamo winding 13; in the third and other stages, the differential energy flows from the dynamo element 13, to the winding 22 of the load armature, so that in the first stage the dynamo winding 13 operates as a motor and in the third, fourth and fifth stages, as a generator. The armature winding 22, however, operates as a generator in the first and second stages, and as a motor in the third, fourth and fifth stages.

When the controller is in the position indicated as Reverse preferably the entire stator winding is in the circuit but the connections to the armature brushes are reversed. In this step, current from armature 4 now flows to finger z, controller contact 50, wire 51, contact f, finger g, field coil 15, segment i of commutator 44, brush j, finger k, contact 52, finger m, stator coils a, b, c, d, finger n, contact 53, wire p, contact 54, finger r, stator coils dd, cc, bb, aa, finger s, contact 55, finger u, brush v, segment w, finger x, contact 56, finger e, back to armature 4 to complete the circuit. The stator turns and potential exceed that of the armature and will overpower and reverse the current in the armature as indicated in Figure 5. Under these conditions the field element although rotating in one direction will produce a powerful torque on the armature in the direction opposed to its own, it being apparent that the armature by such reverse rotation assists the forward rotation of the field element using it as a fulcrum, the field element in turn being retarded by the stator currents.

The Start position on the controller will make connections from the battery 41 to the armature and a circuit in multiple to the armature is also established including the field and the stator winding in series with each other. In this position, current flows from the battery 41 to finger 57, contact 58, to a divided path. Part of the current flows to finger z, armature 4, finger e, contact f, wire 51, contact 58ª, back to the battery 41. The other part of the current flows from contact 58, to finger x, segment w of commutator 44, brush v, finger u, contact tt, finger hh, stator coil bb, finger ss, contact 59ª, wire p, contact 60, finger pp, stator coil b, finger ee, contact oo, finger k, brush j, segment i of commutator 44, field 15, finger g, contact f, wire 51, contact 58ª, and finger 59, back to the battery 41 to complete the second circuit. Figure 5 shows that both armature and stator currents are reversed causing the field element to rotate forward and to start the engine. The use of both windings for this purpose produces a powerful torque and helps to overcome the engine compression; as the field element gathers speed the counterpotential in the stator winding weakens the field current automatically and enables the field element to attain a vigorous starting speed with a battery of moderate size and voltage. This feature is not claimed herein but is claimed in my copending application Serial No. 162,788, filed January 22, 1927.

My invention also provides electro-magnetic retardation for the vehicle when coasting or when descending a grade. The connections for this purpose are established with the controller in the Brake position with the stator winding included and the armature leads reversed. In this controller position, current from the armature 4 flows to the finger $z$, to the resistance 42, finger 61, contact 62, wire 51, contact $f$, finger $g$, field coil 15, segment $i$ of commutator 44, brush $j$, finger $k$, contact $oo$, finger $ee$, stator coils $c$, $d$, finger $n$, contact 63, wire $p$, contact 64, finger $r$, stator coils $dd$, $cc$, finger $hh$, contact $tt$, finger $u$, brush $v$, segment $w$ of commutator 44, finger $x$, contact 64, finger $e$, back to the armature 4 to complete the circuit. In addition the resistance 42 is in circuit serving to consume a portion of the energy generated. It is seen that the armature drags the field element, the latter being retarded by the stator current, and that the braking can be regulated by adjusting the resistance 42.

The remaining position of the controller is at Off. The armature leads and the stator winding are reversed. With the leads so connected and the vehicle at rest, rotation of the driver or field element cannot generate any current. These connections further serve the purpose of starting the engine by the coasting vehicle, should the engine have stopped as is often the case. Thus current flows from the armature 4 to finger $z$, contact 65, wire 51, contact $f$, finger $g$, field coil 15, segment $i$ of commutator 44, brush $j$, finger $k$, contact $oo$, finger $ee$, stator coil $b$, finger $pp$, contact $qq$, wire $p$, contact $rr$, finger $ss$, stator coil $bb$, finger $hh$, contact $tt$, finger $u$, brush $v$, segment $w$ of commutator 44, finger $x$, contact 64, finger $e$, back to the armature 4 to complete the circuit. The inclusion of the stator winding is important in that it supplies a part of the starting torque and so limits the rush of current in the circuit and greatly relieves the strains in the rear axle gearing.

This device is also capable of charging the battery 41 and connection is made by means of the automatic switch 43 which closes the battery circuit when the generator voltage becomes sufficiently high. Inspection of Figure 4 shows that on steps second and third the battery is connected directly across the armature while on steps fourth and fifth one battery lead is connected to the neutral point of the stator winding and the other to the field lead. On first step one battery lead again connects to the stator neutral and the other to the field commutator lead.

The last contact finger 34 at the extreme left of Figure 4 makes connection with the corresponding contacts on the controller drum so as to short circuit the field winding 15 as the controller is shifted from one operative position to another, the purpose being first to shorten the field, then to break connections and to open the field short after the connections for the new step have been established. This effectively quenches the sparking at the controller contacts.

In Figure 7 I have shown the ends of the stator conductors for a four pole model and in a simple way, the manner in which the ends of the conductors are connected to give the required grouping, showing also the leads from the groups. For the sake of greater clarity I have shown the connections for one phase only, and have represented one coil of said phase, the other coils of the phase being wound and connected progressively in the manner shown, as will be well understood. The correct grouping of the winding is important to insure good commutation at the field commutator. It is seen that when the leads $c\,d$, $a\,c$ or $a\,d$ are actively connected, the center of the stator magnetomotive force will coincide with and be in the postion indicated by the dotted line. This corresponds to the steps 3, 4, 5 and Reverse respectively. For these steps the stator winding is connected in a forward direction so that the field distortion will be in the same direction for the steps mentioned insuring good commutation with the same setting of the brushes 33. In step first, however, a portion of the stator winding is reversed and the field distortion therefore takes place in the opposite direction; to compensate for this, I shift the center of the stator magnetomotive force, as shown by the full radial line in Figure 7, by using the leads $b\,c$ which permits the brushes 33 to remain in their former position.

In Figure 6 I have shown the particular construction of the field commutator comprising the wide active segments 44 and the intermediate segments 45 serving to separate and insulate the active segments 44 from each other. There must be one active and one intermediate section per pole, the commutator illustrated being adapted for four poles. This commutator is wiped by the main brushes 33 of which there must be at least as many as there are phases in the stator winding; similarly they must be spaced from each other the same number of electrical space degrees as the phases of the stator winding. Preferably the main brushes are of such width that in a three phase machine two brushes will make full contact with the active segments.

The described arrangement will give good commutation with moderate voltages. For higher voltages and in order still further to improve the commutation, the field commutator is provided with auxiliary brushes 46, which are much narrower and thinner than the main brushes 33 and respectively connected to the latter through the resistances 47. The position of the auxiliary brushes on the commutator is such that the main brushes leave the active segments just before the auxiliary brushes to the end that any small amount of current still at the brushes at that moment will be forced to traverse the resistance 47 before the final break between the brushes and active segments occurs.

It is obvious that various modifications may be made in the construction shown in the drawings and above particularly described within the principle and scope of my invention.

I claim:

1. The method of transmitting power from a rotating field member that is operated by a prime mover at a predetermined torque to a driven armature member inductively related to the field member in one stage at a torque exceeding that of the prime mover and in another stage at torque substantially equalling that of the prime mover, said method consisting in the first stage in feeding the slip energy to a stationary winding inductively related to the field member to cause the stationary winding to exert an added torque upon the field member and through it upon the armature, and in the second stage increasing the armature speed to substantially that of the field member by leaving the stationary winding out of the armature circuit.

2. The method of transmitting power from a driving rotative member receiving energy from an external source to a driven rotative member consisting in inducing a voltage in an induced winding on the driven member by the rotation of a field member in inductive relation thereto, simultaneously inducing an independent voltage in a second induced winding by the rotation of the field member in inductive relation thereto, supplying the voltage in the second winding to the first winding, and varying the turns of the second winding to vary the voltage induced therein.

3. An electro-magnetic power transmission device comprising a driving rotative field member including a field winding, a stator adjacent the field member on one side thereof and including a core arranged to conduct the field flux and a polyphase winding inductively related to the field winding, a driven rotative armature opposing the field member on the other side thereof and including a core completing the flux path and a winding inductively related to the field winding, means for connecting the three windings in series with each other, and means for varying the turns in series of the several phases of the stator winding.

4. An electro-magnetic power transmission device comprising a driving rotative field member including a field winding, a stator adjacent the field member on one side thereof and including a core arranged to conduct the field flux and a polyphase winding inductively related to the field winding, a driven rotative armature opposing the field member on the other side thereof and including a core completing the flux path and a winding inductively related to the field winding, means for connecting the three windings in series with each other, and means for including a portion of each phase of the stator winding into the circuit in a reverse direction with respect to the armature winding.

5. An electro-magnetic power transmission device comprising a driving rotative field member including a field winding, a stator adjacent the field member on one side thereof and including a core arranged to conduct the field flux and a polyphase winding inductively related to the field winding, a driven rotative armature opposing the field member on the other side thereof and including a core completing the flux path and a winding inductively related to the field winding, means for connecting the three windings in series with each other, and means for reversing the armature connections and the stator connections with respect to the field winding.

6. An electro-magnetic power transmission device comprising a driving rotative field member including field coils and a commutator, a stator facing the field member on one side and including a core and a polyphase winding inductively related to the field member, a driven rotative armature facing the other side of the field member and including a core and a commutator and a winding connected to the commutator and inductively related to the field member, stationary polyphase spaced brushes wiping the field commutator, direct current brushes carried by the field member and wiping the armature commutator, and controlling means arranged in control of the circuit connections and operative for one step to connect a relatively large number of the turns of each phase of the stator winding to the respective polyphase brushes and for another step to connect a lesser number of turns of each phase of the stator winding to the respective polyphase brushes, said controlling means including means for making connection between the field coils and the field commutator to form with the stator winding a series circuit for each step.

7. An electro-magnetic power transmission device comprising a driving rotative field member including field coils and a commutator, a stator facing the field member on one side and including a core and a polyphase winding inductively related to the field member, a driven rotative armature facing the other side of the field member and including a core and a commutator and a winding connected to the commutator and inductively related to the field member, stationary polyphase spaced brushes wiping the field commutator, direct current brushes carried by the field member and wiping the armature commutator, and controlling means arranged in control of the circuit connections and operative for one step to connect a relatively large number of the turns of each phase of the stator winding to the respective polyphase brushes, for another step to connect a lesser number of turns of each phase of the stator winding to the respective polyphase brushes, and for another step to connect a relatively small number of turns of each phase of the stator winding in a reverse direction to the respective polyphase brushes, said controlling means including means for making connection between the field coils and the field commutator to form with the stator winding a series circuit for each step.

8. An electro-magnetic power transmission device comprising a driving rotative field member including field coils and a commutator, a stator facing the field member on one side and including a core and a polyphase winding inductively related to the field member, a driven rotative armature facing the other side of the field member and including a core and a commutator and a winding connected to the commutator and inductively related to the field member, a stationary polyphase spaced brushes wiping the field commutator, direct current brushes carried by the field member and wiping the armature commutator, and controlling means arranged in control of the circuit connections and operative for one step to connect each phase of the stator winding to the respective polyphase brushes and to connect the direct current brushes with the field and field commutator leads, whereby the field coils, stator winding and armature winding are connected in series, and for another step to reverse the connections of the direct-current brushes into the circuit.

9. An electro-magnetic power transmission device comprising a driving rotative field member including field coils and a commutator, a stator facing the field member on one side and including a core and a polyphase winding inductively related to the field member, a driven rotative armature facing the other side of the field member and including a core and a commutator and a winding connected to the commutator and inductively related to the field member, stationary polyphase spaced brushes wiping the field commutator, direct current brushes carried by the field member and wiping the armature commutator, and controlling means arranged in control of the circuit connections and operative for one step to connect each phase of the stator winding to the respective polyphase brushes and to connect the direct current brushes with the field and field commutator leads, whereby the field coils, stator winding and armature winding are connected in series, and for another step to reverse the connections of the stator winding and of the direct current brushes.

10. An electric-magnetic power transmission device comprising a driving rotative field member including field coils and a commutator, a stator facing the field member on one side and including a core and a polyphase winding inductively related to the field member, a driven rotative armature facing the other side of the field member and including a core and a commutator and a winding connected to the commutator and inductively related to the field member, stationary polyphase spaced brushes wiping the field commutator, direct current brushes carried by the field member and wiping the armature commutator, and controlling means arranged in control of the circuit connections and operative for one step to connect a relatively large number of the turns of each phase of the stator winding to the respective polyphase brushes and to connect the direct current brushes with the field and field commutator leads, and for another step to connect a lesser number of turns of each phase of the stator winding to the respective polyphase brushes and to reverse the connections of the direct current brushes into the circuit.

11. An electro-magnetic power transmission device comprising a driving rotative field member, a stator including a polyphase winding inductively related to the field member, a driven rotative armature including a winding inductively related to the field member, each phase of the polyphase winding being divided into a number of groups and having leads from the opposite ends of each group and one group being arranged partially on each end of the phase winding, whereby the center of the stator magneto motive force is unchanged for various of the lead connections and is properly shifted when two of the leads are connected in a reverse direction, and means including a commutator and polyphase spaced brushes for variously connecting the groups of each phase of the stator winding in series with the armature winding and coils of the field member.

12. The means for operating a load shaft at speeds over and under that of the power shaft which comprises an armature for one of the shafts, a field element including series field coils for the other shaft, a second dynamo element cooperatively associated with the power shaft for an interchange of mechanical energy therebetween, means for passing substantially the entire current from the armature through the field coils when the load shaft underspeeds the power shaft and for passing substantially the entire current from the second dynamo element through the field coils when the load shaft overspeeds the power shaft and means for changing the speed of the load shaft from one condition to the other.

13. The method of energizing the field of a clutch dynamo interposed between a power source and a load for operation of the load at speeds below and above the power source which consists in energizing said field from the armature of the clutch dynamo when the load operates at a speed below that of the power source and energizing said field from an auxiliary dynamo element receiving energy from the power source when the load operates at speeds above the power source.

In witness whereof, I hereunto subscribe my signature.

ALFONS H. NEULAND.